(12) United States Patent
Zhou et al.

(10) Patent No.: US 9,882,372 B2
(45) Date of Patent: Jan. 30, 2018

(54) ELECTRONIC DEVICE AND POWER PROTECTION METHOD

(71) Applicant: ASUSTeK COMPUTER INC., Taipei (TW)

(72) Inventors: Xiao-Feng Zhou, Taipei (TW); Wei Han, Taipei (TW); Ching-Ji Liang, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 244 days.

(21) Appl. No.: 14/856,572

(22) Filed: Sep. 17, 2015

(65) Prior Publication Data

US 2016/0126721 A1    May 5, 2016

(30) Foreign Application Priority Data

Oct. 30, 2014    (CN) .......................... 2014 1 0598937

(51) Int. Cl.

| | |
|---|---|
| H05B 41/36 | (2006.01) |
| G05F 1/46 | (2006.01) |
| H05B 33/08 | (2006.01) |
| H02M 3/335 | (2006.01) |
| H02H 9/00 | (2006.01) |
| H02H 3/20 | (2006.01) |

(52) U.S. Cl.
CPC ............ H02H 9/001 (2013.01); H02H 3/207 (2013.01)

(58) Field of Classification Search
CPC .......... H02H 9/001; H02H 3/207; H02H 3/24; H05B 41/36; H05B 33/08; G05F 1/46; H02M 3/335; H02M 3/158

USPC ..... 307/43–87; 327/108–112, 379, 389, 391; 326/22–27, 81–87

See application file for complete search history.

(56) References Cited

U.S. PATENT DOCUMENTS

| | | | | |
|---|---|---|---|---|
| 7,064,532 B1 * | 6/2006 | Suzuki | ................... | G05F 1/573 |
| | | | | 323/276 |
| 7,239,532 B1 * | 7/2007 | Hsu | ................... | H02M 3/33523 |
| | | | | 363/21.12 |
| 7,826,190 B2 * | 11/2010 | Wu | ....................... | H02H 3/202 |
| | | | | 361/111 |
| 8,018,699 B2 | 9/2011 | Smith et al. | | |

(Continued)

FOREIGN PATENT DOCUMENTS

| | | |
|---|---|---|
| CN | 101217252 A | 7/2008 |
| CN | 103187710 A | 7/2013 |
| CN | 103390877 A | 11/2013 |

*Primary Examiner* — Brandon S Cole
(74) *Attorney, Agent, or Firm* — CKC & Partners Co., Ltd.

(57) ABSTRACT

An electronic device and a power protection method are provided. The electronic device includes a transfer port, a switch, a first detecting unit and a second detecting unit. The transfer port provides a driving voltage to an external device. The switch is coupled between the transfer port and a supply power source, and the switch is selectively turned off according to at least one of a first control signal and a second control signal. The first detecting unit generates the first control signal when a voltage drop of the driving voltage exceeds a threshold voltage. The second detecting unit generates a sampling voltage by detecting the driving voltage and generates the second control signal when the sampling voltage is lower than a first reference voltage. The electronic device can provide a power protection when an external device is plugged in/out the transfer port.

10 Claims, 4 Drawing Sheets

(56) References Cited

U.S. PATENT DOCUMENTS

| | | | |
|---|---|---|---|
| 8,427,802 B2 | 4/2013 | Yoshizawa | |
| 2001/0028571 A1* | 10/2001 | Hanada | H02H 9/001 363/50 |
| 2008/0186644 A1 | 8/2008 | Migliavacca | |
| 2008/0304294 A1 | 12/2008 | Hsiao | |
| 2009/0268355 A1 | 10/2009 | Wang | |
| 2010/0091420 A1* | 4/2010 | Tsai | H02H 7/1213 361/90 |
| 2010/0284116 A1* | 11/2010 | Yoshizawa | H02H 9/001 361/91.3 |
| 2011/0317322 A1* | 12/2011 | Chien | H02H 7/12 361/90 |
| 2013/0038213 A1* | 2/2013 | Son | H05B 33/0812 315/122 |
| 2013/0200863 A1* | 8/2013 | Hung | H02M 1/32 323/234 |
| 2013/0294118 A1* | 11/2013 | So | H02M 3/33507 363/21.16 |
| 2014/0071714 A1* | 3/2014 | Li | H02M 3/33507 363/16 |

* cited by examiner

ELECTRONIC DEVICE AND POWER PROTECTION METHOD

CROSS-REFERENCE TO RELATED APPLICATION

This application claims the priority benefit of China application serial No. 201410598937.3, filed on Oct. 30, 2014. The entirety of the above-mentioned patent application is hereby incorporated by references herein and made a part of specification.

BACKGROUND OF THE INVENTION

Field of the Invention

The disclosure relates to an electronic device and, more particularly, to an electronic device with a power protection.

Description of the Related Art

In general, a variety of transport interfaces are disposed at consumer electronic devices for connecting to an external device for transferring data and charging.

When the external device is plugged in/out a transfer port of the electronic device, inrush current caused by a transient voltage change is generated on the transfer port of the electronic device and thus damage the electronic device permanently.

BRIEF SUMMARY OF THE INVENTION

An electronic device includes a transfer port, a first switch, a first detecting unit, a second detecting unit and a triggering unit. The transfer port provides a driving voltage to an external device. The first switch is coupled between the transfer port and a supply power source, and the first switch is selectively turned off according to at least one of a first control signal and a second control signal. The first detecting unit generates the first control signal when a voltage drop of a driving voltage exceeds than a threshold voltage. The second detecting unit detects the driving voltage to generate a sampling voltage, and the second control signal is generated when the sampling voltage is lower than a first reference voltage.

A power protection method applied to an electronic device including a transfer port is provided. The transfer port provides a driving voltage to an external device. The electronic device includes a first switch. The first switch is coupled between the transfer port and a supply power source. The power protection method includes: detecting the driving voltage via a capacitor and generating a first control signal when a voltage drop of the driving voltage is greater than a threshold voltage; generating a sampling voltage by that the voltage division circuit divides the driving voltage, and generating a second control signal when the sampling voltage is lower than a first reference voltage; and turning off the first switch according to at least one of the first control signal and the second control signal.

In sum, the electronic device can provide a power protection when an external device is plugged in/out the transfer port. As a result, the reliability and safety of an internal core circuit of the electronic device are improved.

BRIEF DESCRIPTION OF THE DRAWINGS

These and other features, aspects and advantages of the disclosure will become better understood with regard to the following embodiments and accompanying drawings.

DETAILED DESCRIPTION OF THE EMBODIMENTS

Figure 1:
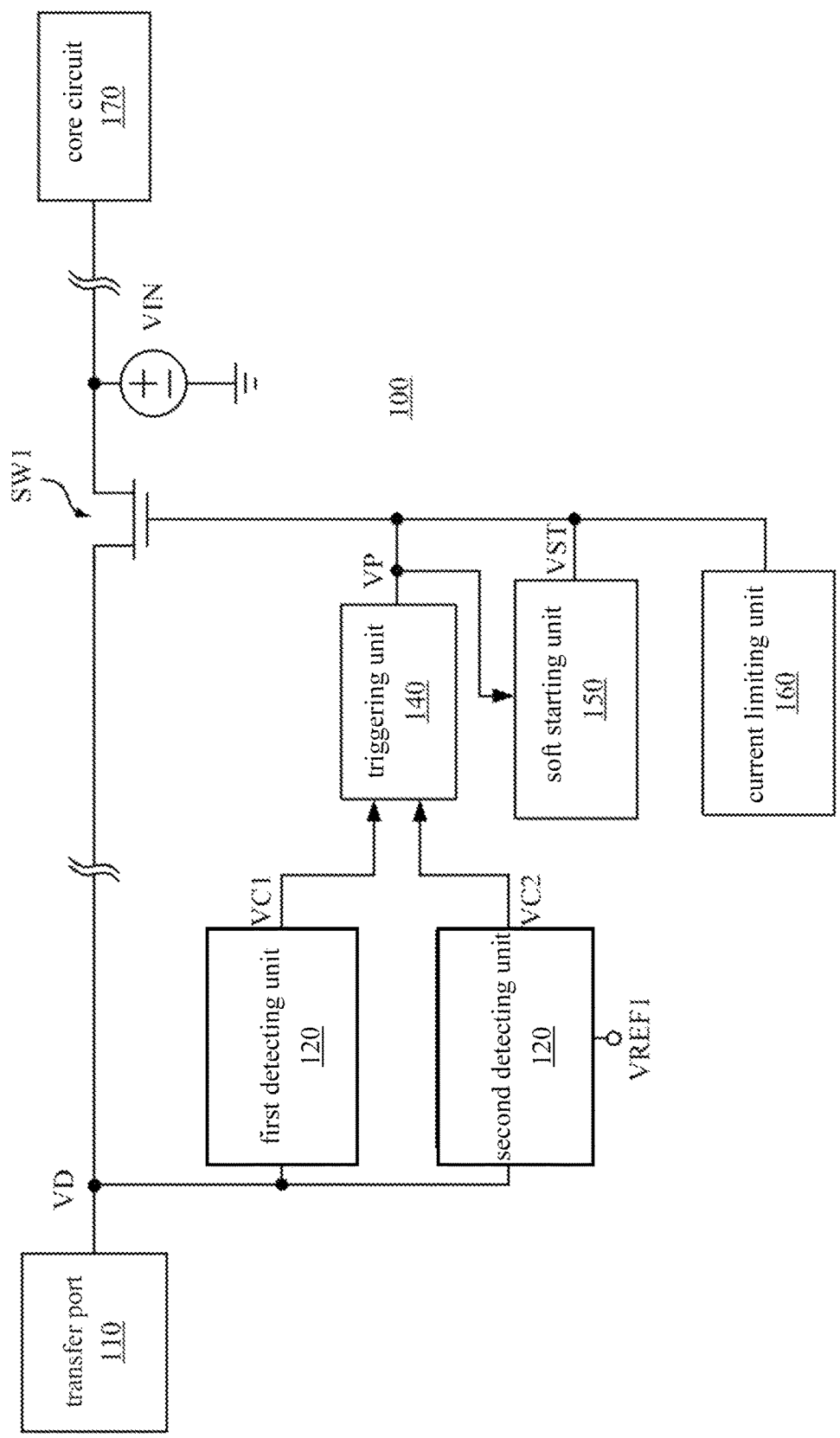
FIG. 1 is a schematic diagram showing an electronic device in an embodiment.

FIG. 1 is a schematic diagram showing an electronic device in an embodiment. In an embodiment, an electronic device 100 is an electronic product, such as a personal computer, a laptop, a tablet computer, a smart phone, which is not limited herein.

As shown in FIG. 1, the electronic device 100 includes a transfer port 110, a first switch SW1, a first detecting unit 120, a second detecting unit 130, a triggering unit 140, a soft starting unit 150, a current limiting unit 160 and a core circuit 170.

The transfer port 110 is used to provide a driving voltage VD to an external device. In an embodiment, the transfer port 110 is a bus, such as a universal serial bus (USB), micro USB, which is not limited herein. The core circuit 170 includes a processor and/or a control chip of the system, which is not limited herein.

Figure 2:
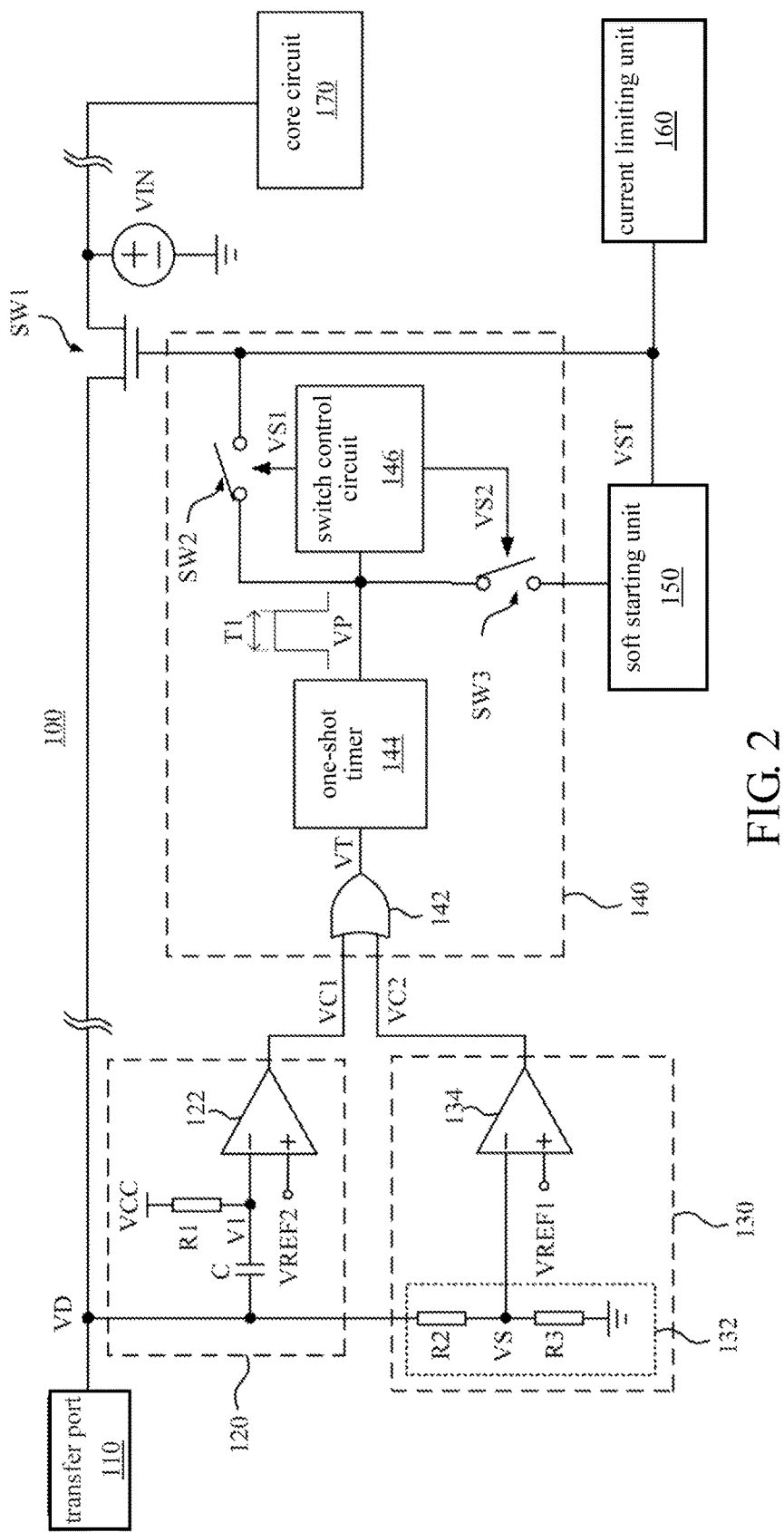
FIG. 2 is a schematic diagram showing configuration of the electronic device in FIG. 1 in an embodiment.

As shown in FIG. 1, the first detecting unit 120 generates a first control signal VC1 when a voltage drop of the driving voltage VD exceeds a threshold voltage, and the voltage drop is instantaneously generated due to plug in/out of the external device. The second detecting unit 130 detects the driving voltage VD to generate a sampling voltage (a sampling voltage VS as shown in FIG. 2), and a second control signal VC2 is generated when the sampling voltage VS is lower than a reference voltage VREF1.

The first switch SW1 is coupled between the transfer port 110 and a supply power source VIN, and the first switch is selectively turned on or off according to the control of the triggering unit 140 and the current limiting unit 160.

For example, in the normal operation, the current limiting unit 160 detects a current flowing through the first switch SW1 to determine a switching period of the first switch SW1 to achieve a current-limiting protection. When the external device is plugged in/out the transfer port 110, the triggering unit 140 generates the protection signal VP according to at least one of the first control signal VC1 and the second control signal VC2 to turn off the first switch SW1. As a result, it can avoid that the too large inrush current generated by the driving voltage VD due to the plug in/out to burn the core circuit 170 of the electronic device 100.

The function and operation of the electronic device 100 will become better understood with regard to the following embodiments, and the disclosure is not limited thereto.

FIG. 2 is a schematic diagram showing configuration of the electronic device in FIG. 1. As shown in FIG. 2, the first detecting unit 120 includes a comparator 122, a resistor R1 and a capacitor C.

In the embodiment, a first terminal of the resistor R1 receives a system voltage VCC, and a second terminal of the resistor R1 is coupled to an input terminal of the comparator 122 to generate a bias voltage V1. A first terminal of the capacitor C receives the driving voltage VD, and a second terminal of the capacitor C is coupled to the second terminal of the resistor R1 to receive the bias voltage V1. In other embodiments, the bias voltage V1 can be provided by an external supply power source directly.

Consequently, due to the characteristic of the capacitor C, the capacitor C can make the voltage drop instantaneously generated by the driving voltage VD to response rapidly in the bias voltage. The comparator 122 compares a reference voltage VREF2 with the bias voltage V1 to generate the first control signal VC1.

In other words, the threshold voltage is a difference between the reference voltage VREF2 and the bias voltage V1, that is |VREF2−V1|. The comparator 122 generates the first control signal VC1 when the voltage drop of the driving voltage VD exceeds the threshold voltage |VREF2−V1|, wherein the voltage drop is instantaneously generated due to the plug in/out of the external device.

Furthermore, as shown in FIG. 2, the second detecting unit 130 includes a voltage division circuit 132 and a comparator 134. The voltage division circuit 132 is formed by a resistor R2 and a resistor R3 connected in series, the voltage division circuit 132 is used to divide the driving voltage VD to generate the sampling voltage VS.

The comparator 134 compares the sampling voltage VS with the reference voltage VREF1 to generate the second control signal VC2 when the sampling voltage VS is lower than the reference voltage VREF1.

Please refer to FIG. 2, the triggering unit 140 includes an OR gate 142, a one-shot timer 144, a switch control circuit 146, a second switch SW2 and a third switch SW3.

The OR gate 142 receives the first control signal VC1 and the second control signal VC2 and transmits a triggering signal VT accordingly. That means, the OR gate 142 generates the triggering signal VT to the one-shot timer 144 when the voltage drop of the driving voltage VD instantaneously generated exceeds the threshold voltage due to the plug in/out of the external device or when the sampling voltage VS is lower than the reference voltage VREF1.

The one-shot timer 144 generates a protection signal VP with preset pulse width time T1 according to the triggering signal VT to turn off the first switch SW1. As a result, it can avoid that the core circuit 170 burns by the inrush current generated due to the plug in/out of the external device.

In detail, the first detecting unit 120 utilizes the characteristic of the capacitor circuits (that is the capacitor C1 or the capacitor circuits including capacitors connected in serial and parallel) to detect the change of the driving voltage VD. The second detecting unit 130 utilizes the resistor circuits (that is the voltage division circuit 132 or the resistor circuits including resistors in serial and parallel) to detect the change of the driving voltage VD. Consequently, the first detecting unit 120 includes shorter time for responding to the change of the driving voltage VD than the second detecting unit 130. The driving voltage VD may change in different speed when an external device is plugged in/out the transfer port 110, consequently, a power protection to the core circuit 170 can be achieved by the first detecting unit 120 and the second detecting unit 130 with different response time.

Please refer to FIG. 2, the switch control circuit 146 is coupled to the one-shot timer 144, and the switch control circuit 146 generates the first switching signal VS1 and the second switching signal VS2 according to the protection signal VP. In some embodiments, all of the first switching signal VS1, the second switching signal VS2 and the protection signal VP include the preset pulse width time T1 of the same length.

The second switch SW2 is coupled to the one-shot timer 144, and the second switch SW2 is selectively turned on according to the first switching signal VS1 to transmit the protection signal VP to a control terminal of the first switch SW1. The third switch SW3 is coupled to the one-shot timer 144, and third switch SW3 is selectively turned on according to the second switching signal VS2 to transmit the protection signal VP to the soft starting unit 150. The soft starting unit 150 can generate the soft starting signal VST according to the protection signal VP. As a result, after the first switch SW1 is turned off via the protection signal VP, the soft starting unit 150 can turn on the first switch SW1 again to reconnect the supply power source VIN and the transfer port 110. The operation is illustrated in details hereafter.

Figure 3:
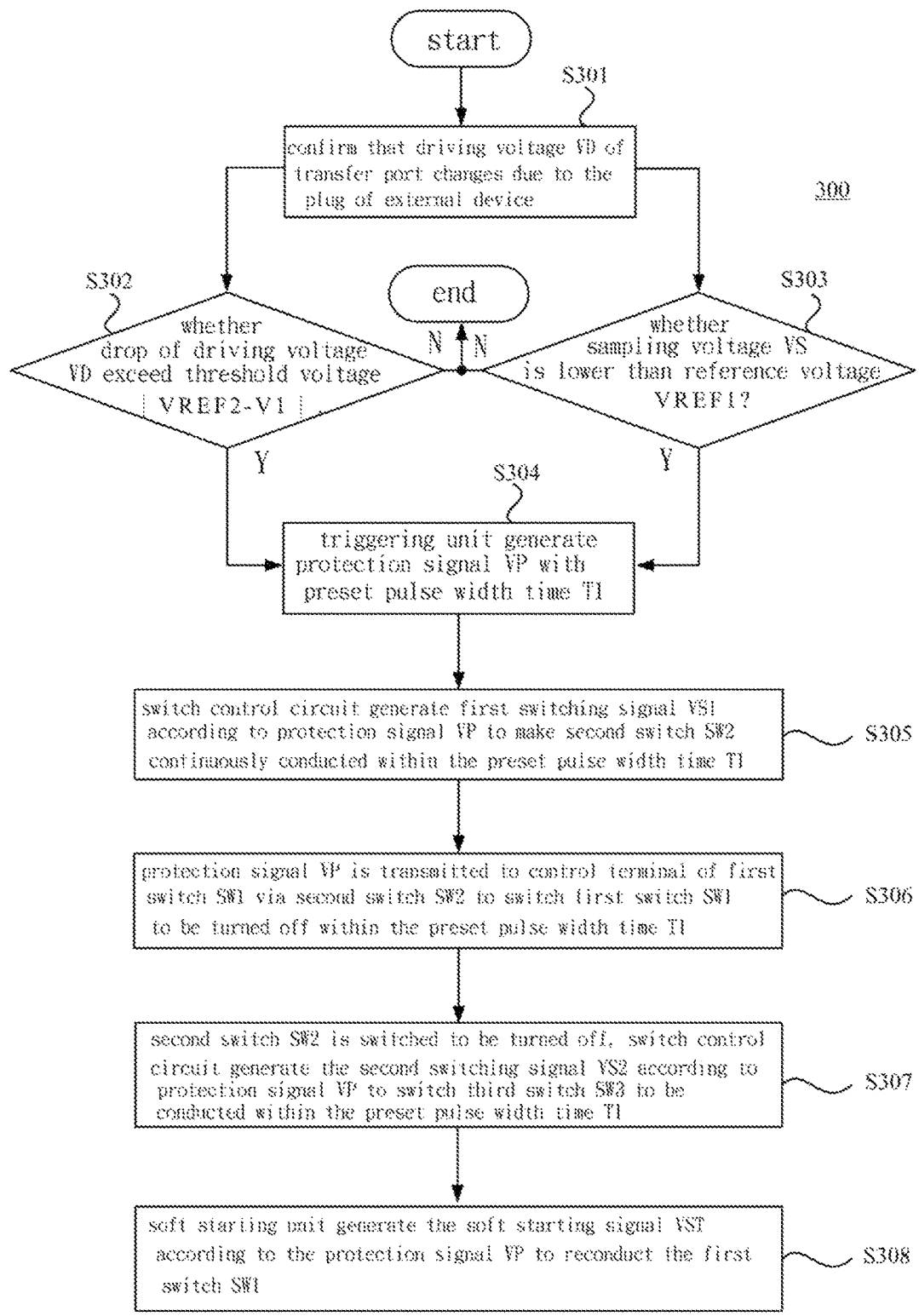
FIG. 3 is a flow chart showing a power protection method in an embodiment.

FIG. 3 is a flow chart showing a power protection method in an embodiment. Please refer to FIG. 2 and FIG. 3, the operation of the electronic device 100 is illustrated cooperating with the power protection method 300.

In step S301, the electronic device 100 determines that the driving voltage VD of the transfer port 110 changes due to the plug in/out of the external device.

In step S302, the first detecting unit 120 detects whether the voltage drop of the driving voltage VD exceeds the threshold voltage via the capacitor C, if the voltage drop of the driving voltage VD is greater than the threshold voltage, the first detecting unit 120 outputs the first control signal VC1.

In step S303, the second detecting unit 130 generates the sampling voltage VS via the voltage division circuit 132, and whether the sampling voltage VS is lower than the reference voltage VREF1 is determined. When the sampling voltage VS is lower than the reference voltage VREF1, the detecting unit 130 outputs the second control signal VC2.

In step S304, the triggering unit 140 generates the protection signal VP with the preset pulse width time T1 according to the first control signal VC1 or the second control signal VC2, thus, the switch SW1 is selectively turned off according to at least one of the first control signal VC1 and the second control signal VC2.

In step S305, the switch control circuit 146 generates the first switching signal VS1 according to the protection signal VP to make the second switch SW2 continuously conducted within the preset pulse width time T1.

In step S306, the protection signal VP is transmitted to the control terminal of the first switch SW1 via the second switch SW2 to switch the first switch SW1 to be turned off within the preset pulse width time T1.

In step S307, the second switch SW2 is switched to be turned off, at the time, the switch control circuit 146 further generates the second switching signal VS2 according to the protection signal VP to switch the third switch SW3 to be turn on within the preset pulse width time T1, as a result, the protection signal VP generated by the triggering unit 140 is inputted to the soft starting unit 150 via the switch SW3.

In step S308, the soft starting unit 150 generates the soft starting signal VST according to the protection signal VP to reconduct the first switch SW1.

Through the above the operations, the electronic device 100 can avoid the internal core circuit 170 burns due to the inrush current when the external device is plugged in/out the transfer port, and the first switch SW1 is conducted again via the soft starting unit 150 to reconnect the transfer port 110 and the supply power source VIN to ensure normal operation of the system.

Figure 4A:
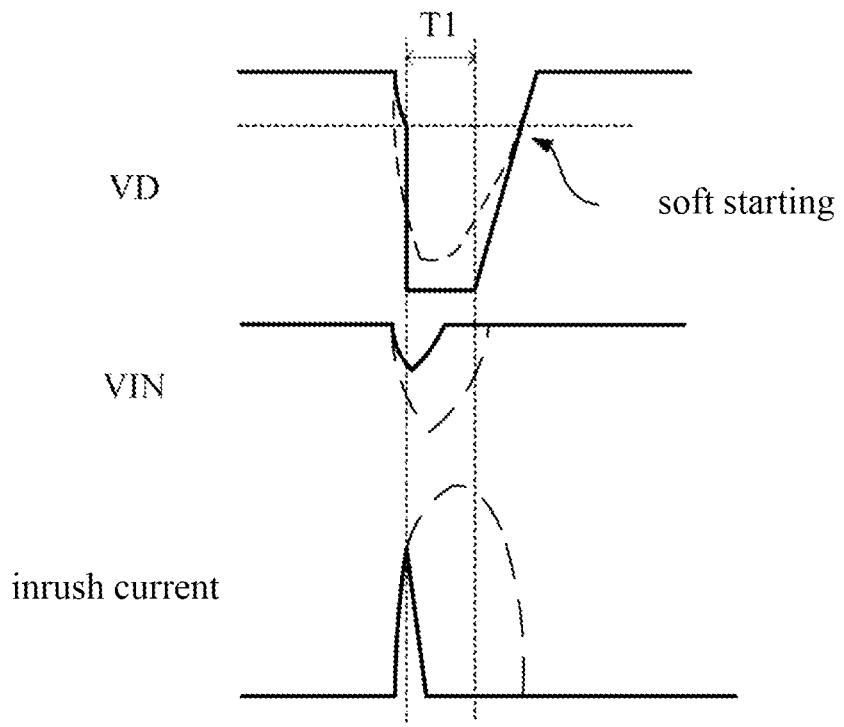
FIG. 4A shows waveforms of a driving voltage, a supply power source and an inrush current when a detecting unit in FIG. 1 is operated.
Figure 4B:
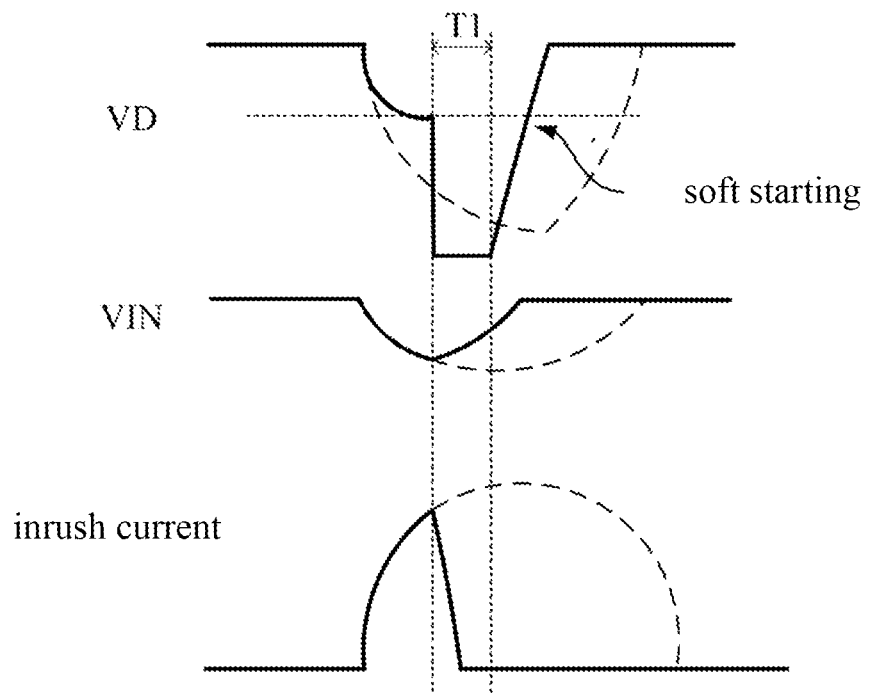
FIG. 4B shows waveforms of a driving voltage, a supply power source and an inrush current when a detecting unit in FIG. 1 is operated.

Please refer to FIG. 4A and FIG. 4B, FIG. 4A shows waveforms of a driving voltage, a supply power source and an inrush current when a detecting unit 120 in FIG. 1 is operated, FIG. 4B shows waveforms of a driving voltage, a supply power source and an inrush current when a detecting unit 130 in FIG. 1 is operated.

The waveforms shown in dotted lines in FIG. 4A and FIG. 4B are conventionally waveforms. As shown in FIG. 4A, when the transfer port 110 is plugged in/out the external device, the driving voltage VD generates the voltage drop instantaneously. At the time, the first detecting unit 120 detects the voltage drop of the driving voltage VD exceeds the threshold voltage, and then the triggering unit 140 generates the protection signal VP, as a result, the first switch SW1 turns off within time T1. Thus, the effect of the inrush current to the supply power source VIN is reduced. After the first switch SW1 is turned off within the time T1, the soft starting unit 150 can reconduct the first switch SW1 to recover the driving voltage VD to ensure normal operation of the system.

As shown in FIG. 4B, the driving voltage VD drops slowly and continuously when the external device is plugged in/out the transfer port 110. If the first detecting unit 120 determines that the sampling voltage VS is lower than the reference voltage VREF1, the triggering unit 140 generates the protection signal VP, and then the first switch SW1 is turned off during the time T1 to achieve the power protection. Similarly, after the first switch SW1 is turned off during the time T1, the soft starting unit 150 can reconduct the first switch SW1 to recover the driving voltage VD.

As shown in FIG. 4A and FIG. 4B, in the embodiments, the inrush current is significantly reduced by the detecting method with different response speeds, the effect of the inrush current on the supply power source VIN is also reduced. As a result, the power protection to the core circuit 170 also can be achieved.

Although the disclosure has been disclosed with reference to certain preferred embodiments thereof, the disclosure is not for limiting the scope. Persons having ordinary skill in the art may make various modifications and changes without departing from the spirit and the scope of the disclosure. Therefore, the scope of the appended claims should not be limited to the description of the preferred embodiments described above.

What is claimed is:

1. An electronic device, comprising:
   a transfer port providing a driving voltage to an external device;
   a first switch coupled between the transfer port and a supply power source, wherein the first switch is selectively turned off according to at least one of a first control signal and a second control signal;
   a first detecting unit including:
   a comparator configured to compare a second reference voltage with a bias voltage; and
   a capacitor including a first terminal configured to receive the driving voltage and a second terminal configured to receive the bias voltage,
   wherein when a voltage drop of the driving voltage exceeds a threshold voltage the first detecting unit generates a first control signal, and the threshold voltage is a difference between the second reference voltage and the bias voltage; and
   a second detecting unit detecting the driving voltage and generating a sampling voltage and generating the second control signal when the sampling voltage is lower than a first reference voltage.

2. The electronic device according to claim 1, wherein the first detecting unit includes:
   a resistor having a first terminal and a second terminal, the first terminal receives a system voltage, and the second terminal generates the bias voltage.

3. The electronic device according to claim 1, wherein the second detecting unit includes:
   a voltage division circuit dividing the driving voltage to generate the sampling voltage; and
   a comparator comparing the sampling voltage with the first reference voltage, wherein the second control signal is generated when the sampling voltage is lower than the first reference voltage.

4. The electronic device according to claim 1, further comprising:
   a triggering unit generating a protection signal according to at least one of the first control signal and the second control signal, wherein the first switch is selectively turned off according to the protection signal.

5. The electronic device according to claim 4, wherein the triggering unit includes:
   an OR gate generating a triggering signal according to the first control signal and the second control signal; and
   an one-shot timer connected to OR gate for generating a protection signal of a preset pulse width time according to the triggering signal, wherein the first switch is turned off within the preset pulse width time.

6. The electronic device according to claim 5, wherein the triggering unit further includes:
   a switch control circuit connected to the one-shot timer for generating a first switching signal according to the protection signal; and
   a second switch connected to the one-shot timer, wherein the second switch is turned on according to the first switching signal to transmit the protection signal to the first switch.

7. The electronic device according to claim 6, wherein the switch control circuit further generates a second switching signal according to the protection signal, and the triggering unit further includes a third switch, the electronic device further includes:
   a soft starting unit generating a soft starting signal according to the protection signal to turn on the first switch which is turned off by the protection signal, wherein the third switch is turned on according to the second switching signal to transmit the protection signal to the soft starting unit.

8. A power protection method, applied to an electronic device including a transfer port, wherein the transfer port provides a driving voltage to an external device, and the electronic device includes a first switch coupled between the transfer port and a supply power source and a second switch, wherein the power protection method includes:
   detecting the driving voltage via a capacitor and generating a first control signal when a voltage drop of the driving voltage is greater than a threshold voltage;
   generating a sampling voltage by that the voltage division circuit divides the driving voltage, and generating a second control signal when the sampling voltage is lower than a first reference voltage;
   generating a protection signal by triggering a one-shot timer according to at least one of the first control signal and the second control signal;
   generating a first switching signal according to the protection signal by a switch control circuit and
   turning the second switch via the first switching signal to transmit the protection signal to turn off the first switch.

9. The power protection method according to claim 8, further comprising:
   turning the first switch via a soft starting signal after the first switch is turned off.

10. The power protection method according to claim 8, wherein the electronic device further includes a third switch, and the step of reconducting the first switch further includes:
   generating a second switching signal according to the protection signal via the switch control circuit;
   conducting the third switch after the second switch is turned off via the second switching signal to transmit the protection signal to a soft starting unit; and
   generating the soft starting signal according to the protection signal via the soft starting unit.

* * * * *